United States Patent
Shiina (10) Patent No.: US 10,620,489 B2
(45) Date of Patent: Apr. 14, 2020

(54) LIQUID CRYSTAL DISPLAY DEVICE

(71) Applicant: Japan Display Inc., Minato-ku (JP)

(72) Inventor: Hideki Shiina, Tokyo (JP)

(73) Assignee: Japan Display Inc., Minato-ku (JP)

(*) Notice: Subject to any disclaimer, the term of this patent is extended or adjusted under 35 U.S.C. 154(b) by 0 days.

(21) Appl. No.: 16/109,989

(22) Filed: Aug. 23, 2018

(65) Prior Publication Data

US 2019/0064608 A1    Feb. 28, 2019

(30) Foreign Application Priority Data

Aug. 24, 2017   (JP) .................. 2017-161449

(51) Int. Cl.

| G02F 1/1343 | (2006.01) |
|---|---|
| G02F 1/1368 | (2006.01) |
| G02F 1/1362 | (2006.01) |
| G02F 1/133 | (2006.01) |
| G02F 1/1337 | (2006.01) |
| G02F 1/1339 | (2006.01) |

(52) U.S. Cl.
CPC ...... *G02F 1/134309* (2013.01); *G02F 1/1337* (2013.01); *G02F 1/1339* (2013.01); *G02F 1/1343* (2013.01); *G02F 1/1368* (2013.01); *G02F 1/13306* (2013.01); *G02F 1/13439* (2013.01); *G02F 1/134363* (2013.01); *G02F 1/136286* (2013.01); *G02F 2201/121* (2013.01); *G02F 2201/123* (2013.01); *G02F 2201/501* (2013.01)

(58) Field of Classification Search
None
See application file for complete search history.

(56) References Cited

U.S. PATENT DOCUMENTS

| 2003/0098939 A1* | 5/2003 | Min ................. G02F 1/134363 349/141 |
|---|---|---|
| 2016/0091764 A1 | 3/2016 | Asozu et al. |
| 2017/0139291 A1* | 5/2017 | Asozu .............. G02F 1/133345 |

FOREIGN PATENT DOCUMENTS

JP    2017-090771    5/2017

\* cited by examiner

*Primary Examiner* — James A Dudek
(74) *Attorney, Agent, or Firm* — Oblon, McClelland, Maier & Neustadt, L.L.P.

(57) ABSTRACT

According to one embodiment, a liquid crystal display device comprises first and second substrates, a sealing member, and a liquid crystal layer. The first substrate includes an image display area, a peripheral area, a common electrode, a scanning line, a signal line, a switching element, a pixel electrode, and first and second electrodes. At least a part of the first electrode is formed of a metal material and is closer to the liquid crystal layer than the scanning and signal lines. The first voltage is applied to the first electrode and the second voltage is applied to the second electrode. Ions in the liquid crystal layer are trapped by an electric field formed between the first and second electrodes.

18 Claims, 8 Drawing Sheets

LIQUID CRYSTAL DISPLAY DEVICE

CROSS-REFERENCE TO RELATED APPLICATIONS

This application is based upon and claims the benefit of priority from Japanese Patent Application No. 2017-161449, filed Aug. 24, 2017, the entire contents of which are incorporated herein by reference.

FIELD

Embodiments described herein relate generally to a liquid crystal display device.

BACKGROUND

A liquid crystal display panel including a first substrate, a second substrate, and a liquid crystal layer interposed between these substrates is known. Ions resulting from impurities or ions eluted from a sealing member which sticks the first substrate and the second substrate to each other often enter the liquid crystal layer. If the ion density becomes locally high in the liquid crystal layer, the effective voltage applied to the liquid crystal layer at this part may be lowered. In accordance with this, the luminance at the part may be lowered and a display image may be affected by black non-uniformity in display or the like.

A technology of disposing an electrode in a peripheral area outside the display area and trapping ions by the electrode to prevent the degradation in display quality in a display area has been proposed. Further improvement in the display quality and reliability has been required for such a liquid crystal display device comprising the electrode for trapping the ions.

DETAILED DESCRIPTION

In general, according to one embodiment, a liquid crystal display device comprises a first substrate, a second substrate, a sealing member, and a liquid crystal layer. The first substrate includes an image display area, a peripheral area outside the display area, a common electrode in the display area, a scanning line extending in the display area, a signal line which extends in the display area and intersects the scanning line, a switching element driven by the scanning line and the signal line, a pixel electrode opposed to the common electrode and connected to the switching element, and a first electrode and a second electrode in the peripheral area. The second substrate is opposed to the first substrate. The sealing member sticks the first substrate and the second substrate to each other. The liquid crystal layer is in a space surrounded by the first substrate, the second substrate, and the sealing member. At least a part of the first electrode is formed of a metal material having a light shielding property and is disposed at a position closer to the liquid crystal layer than the scanning line and the signal line. The first voltage is applied to the first electrode. The second voltage larger than the first voltage is applied to the second electrode. Ions existing in the liquid crystal layer are trapped by an electric field formed between the first electrode and the second electrode.

According to this configuration, degradation in display quality caused by the ions in the liquid crystal layer can be prevented and the reliability of the display device can be increased.

Some embodiments will be described hereinafter with reference to the accompanying drawings. The disclosure is merely an example, and proper changes within the spirit of the invention, which are easily conceivable by a skilled person, are included in the scope of the present invention as a matter of course. In addition, in some cases, in order to make the description clearer, the drawings may be more schematic than in the actual modes, but they are mere examples, and do not limit the interpretation of the present invention. In the drawings, reference numbers of continuously arranged elements equivalent or similar to each other are omitted in some cases. In the specification and the drawings, structural elements performing the same functions as or similar functions to those already described will be given the same reference numbers, and overlapping detailed descriptions may be omitted.

In the present embodiment, a liquid crystal display device is described as an example of the display device. However, each embodiment does not prevent application of individual technical ideas disclosed in the embodiment to the other types of display devices.

[First Embodiment]

Figure 1:
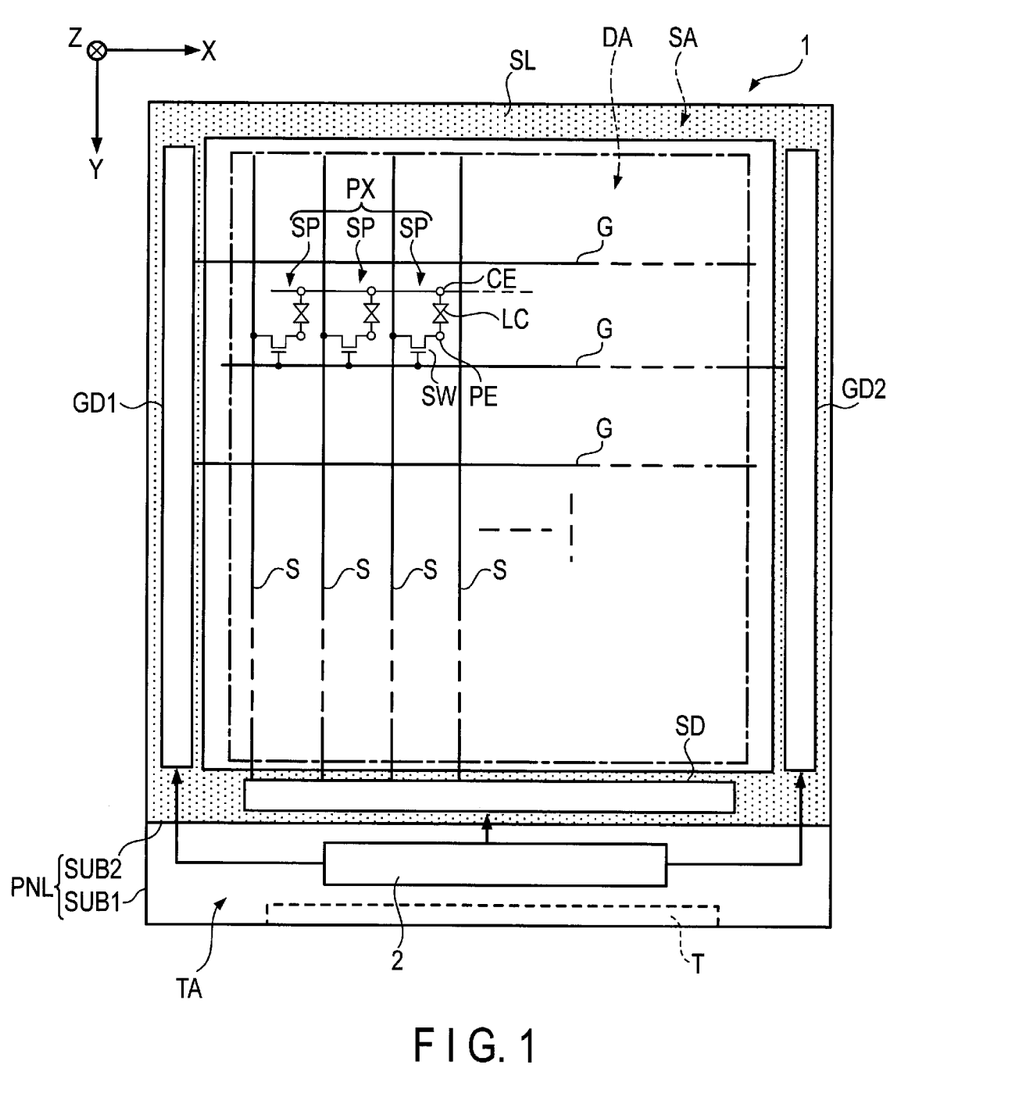
FIG. 1 is a plan view schematically showing a liquid crystal display device according to a first embodiment.

FIG. 1 is a plan view schematically showing a liquid crystal display device 1 (hereinafter referred to as display device 1) according to a first embodiment. The display device 1 comprises a display panel PNL and a controller 2. For example, the display device 1 is a transmissive display device which comprises a backlight opposed to the back surface of the display panel PNL and uses the light from the backlight for image display. As the other example, the display device 1 may be a reflective display device which reflects light such as external light supplied from a front surface of the display panel PNL and uses the reflected light for image display.

The display panel PNL comprises a first substrate SUB1, a second substrate SUB2, a sealing member SL, and a liquid crystal layer LC. The first substrate SUB1 and the second substrate SUB2 are opposed to each other. The sealing member SL is disposed in a frame shape along an edge portion of the display panel PNL, between the first substrate SUB1 and the second substrate SUB2 to stick the first substrate SUB1 and the second substrate SUB2 on each other. The liquid crystal layer LC is disposed in space surrounded by the first substrate SUB1, the second substrate SUB2, and the sealing member SL.

As shown in the drawing, the first direction X, the second direction Y, and the third direction Z will be defined. The directions X, Y, and Z are orthogonal to each other in the present embodiment, but may intersect at an angle other than 90 degrees. In the present disclosure, a direction from the first substrate SUB1 to the second substrate SUB2 is referred to as "above" or "over", and an opposite direction is referred to as "under" or "below".

The display panel PNL includes a display area DA on which an image is displayed, and a peripheral area SA located outside the display area DA. The peripheral area SA includes a terminal area TA where the first substrate SUB1 is exposed from the second substrate SUB2.

The first substrate SUB1 comprises scanning lines G and signal lines S extending in the display area DA. The scanning lines G extend in the first direction X and are arranged in the second direction Y. The signal lines S extend in the second direction Y and are arranged in the first direction X. In the example shown in FIG. 1, an area sectioned by two scanning lines G and two signal lines S corresponds to a sub-pixel SP. One pixel PX is composed of sub-pixels SP of different colors. For example, the pixel PX includes red, green, and blue sub-pixels SP. The pixel PX is not limited to this, but may have the other configuration including a white sub-pixel SP or the like.

The first substrate SUB1 comprises switching elements SW and pixel electrodes PE which are provided for each sub-pixel SP, and common electrodes CE each provided for the sub-pixels SP. The switching element SW is driven by the scanning line G and the signal line S. The pixel electrode PE is connected to the switching element SW.

The first substrate SUB1 comprises scanning line drivers GD1 and GD2, and a signal line driver SD. The scanning line drivers GD1 and GD2 supply scanning signals to the scanning lines G. The signal line driver SD supplies video signals to the signal lines S. In the example shown in FIG. 1, the scanning lines G are alternately connected to the scanning line drivers GD1 and GD2. In the other example, the first substrate SUB1 may comprise either the scanning line driver GD1 or the scanning line driver GD2, and all of the scanning lines G may be connected to the scanning line driver.

The controller 2 is, for example, an IC and is mounted in the terminal area TA. The controller 2 controls the scanning line drivers GD1 and GD2, and the signal line driver SD. A terminal T for external connection is provided in the terminal area TA. For example, a flexible printed circuit is connected to the terminal T. The controller 2 may be mounted on, for example, a member different from the terminal area TA such as the flexible printed circuit.

Figure 2:
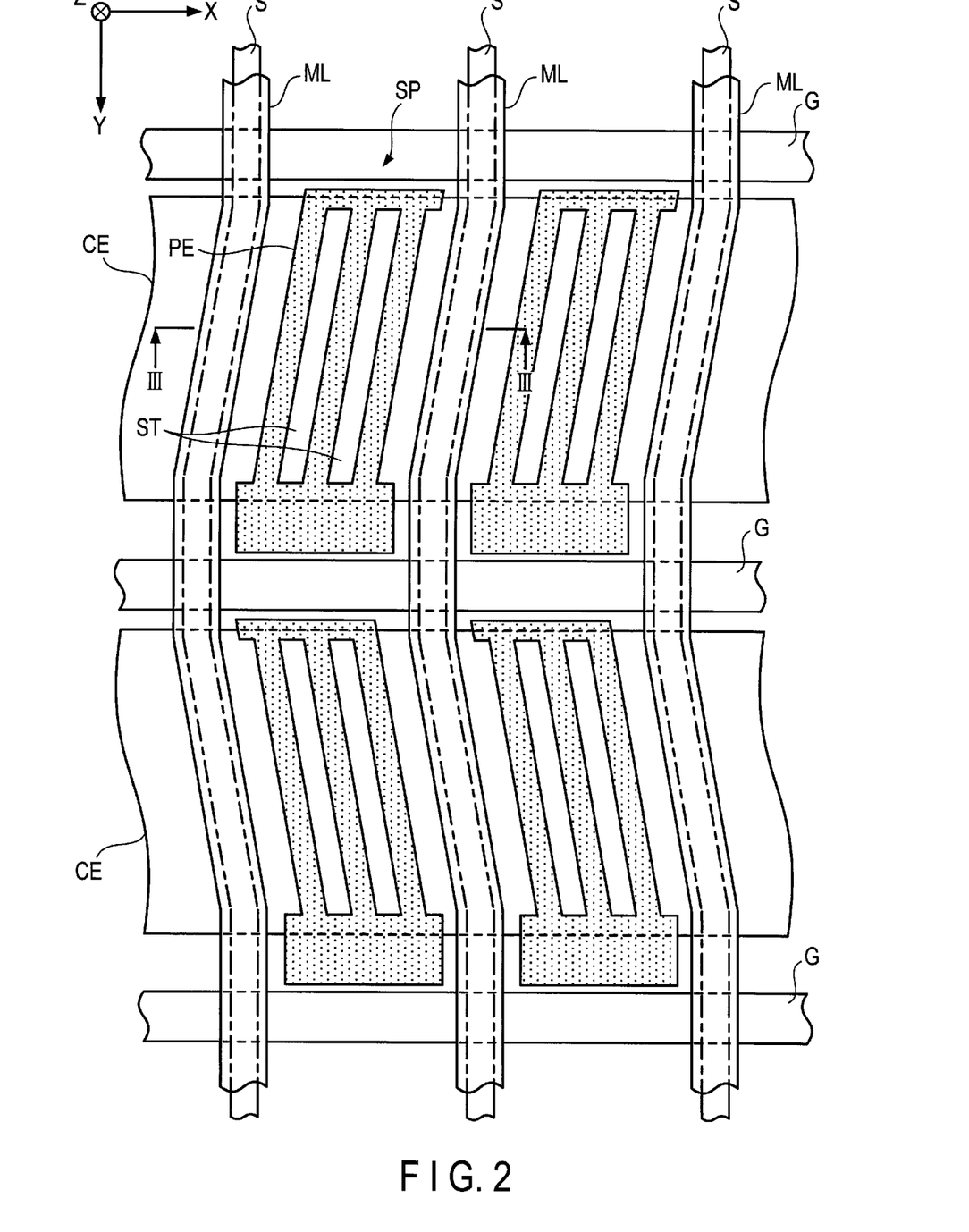
FIG. 2 is a plan view schematically showing a structure of a sub-pixel in the liquid crystal display device.

FIG. 2 is a plan view schematically showing a structure of a sub-pixel SP. Several elements provided on the first substrate SUB1 are illustrated and the illustration of the switching elements SW is omitted.

In the example shown in FIG. 2, the signal lines S extend in the second direction Y while bending. The signal lines S may extend straight in the second direction Y. The Each pixel electrode PE is disposed above the common electrode CE and includes two slits ST. The pixel electrode PE may include one or three or more slits ST or may include no slits ST. Each of the common electrodes CE is disposed between adjacent scanning lines G and opposed to the pixel electrodes PE. The common electrodes CE may overlap the scanning lines G and be provided sequentially along the sub-pixels SP which are arranged in the second direction Y.

The first substrate SUB1 comprises metal lines ML. The metal lines ML are disposed above corresponding signal lines S and overlap the signal lines S in planar view. The metal lines ML are electrically connected to the common electrodes CE. The common electrodes CE arranged in the second direction Y are electrically connected by the metal lines ML.

Figure 3:
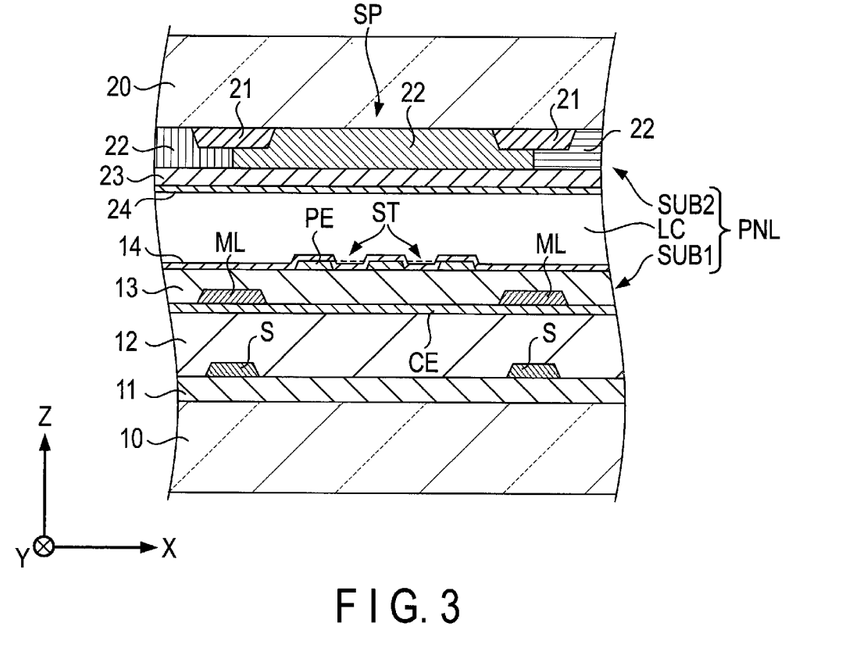
FIG. 3 is a cross-sectional view schematically showing a display panel seen along line in FIG. 2.

FIG. 3 is a cross-sectional view schematically showing the display panel PNL seen along line in FIG. 2. The first substrate SUB1 comprises a first insulating base 10, a first insulating layer 11, a second insulating layer 12, a third insulating layer 13, a first alignment film 14, the signal lines S, the common electrode CE, the pixel electrode PE, and the metal lines ML. The first substrate SUB1 also comprises the scanning lines G, a semiconductor layer of the switching elements SW, and the like.

The first insulating base 10 is, for example, a glass substrate but may be a flexible resin substrate. The first insulating layer 11 covers the first insulating base 10. The signal line S is also disposed on the first insulating layer 11. In FIG. 3, the first insulating layer 11 is a single layer but is actually composed of plural layers. The plural layers include an insulating layer which separates the semiconductor layer of the switching element SW from the scanning lines G, and an insulating layer which separates the scanning lines G or the semiconductor layer from the signal lines S.

The second insulating layer 12 covers the first insulating layer 11 and the signal lines S. The second insulating layer 12 is formed of, for example, an organic resin material and is thicker than the first insulating layer 11 and the third insulating layer 13. The common electrode CE covers the second insulating layer 12. The metal line ML is disposed on the common electrode CE. The third insulating layer 13 covers the common electrode CE and the metal lines ML. The pixel electrodes PE are formed on the third insulating layer 13. The first alignment film 14 covers the third insulating layer 13 and the pixel electrodes PE.

The metal lines ML may be disposed between the second insulating layer 12 and the common electrode CE. In addition, an insulating layer may be interposed between the metal lines ML and the common electrodes CE, and the metal lines ML and the common electrodes CE may be electrically connected through a contact hole formed in the insulating layer.

The second substrate SUB2 comprises a second insulating substrate 20, a light-shielding layer 21, a color filter 22, an overcoat layer 23, and a second alignment film 24. The second insulating base 20 is, for example, a glass substrate but may be a flexible resin substrate.

The light-shielding layer 21 is disposed under the first insulating base 20. The light-shielding layer 21 overlaps the metal lines ML, the signal lines S, and the scanning lines G in planar view. The color filter 22 is colored in a color corresponding to the sub-pixel SP and disposed under the second insulating base 20. For example, a boundary between the color filters 22 having different colors overlaps the light-shielding layer 21 in planar view. The overcoat layer 23 covers the color filter 22. The second alignment film 24 covers the overcoat layer 23. The liquid crystal layer LC is disposed between the first alignment film 14 and the second alignment film 24.

The pixel electrodes PE and the common electrodes CE can be formed of, for example, a transparent conductive material such as indium tin oxide (ITO). The gate lines G, the source lines S, and the metal lines ML can be formed of various metal materials having a light shielding property. The gate lines G, the source lines S, and the metal lines ML may be formed in a single-layer structure or a multilayer structure. Each layer of the gate lines G, the source lines S, and the metal lines ML may be formed of a metal alone or an alloy.

The structure of the display panel PNL shown in FIG. 3 corresponds to Fringe Field Switching (FFS) mode, which is one of In-Plane Switching (IPS) modes. The structure of the display panel PNL is not limited to this but, for example, the common electrode CE may be disposed at a position closer to the liquid crystal layer LC than the pixel electrode PE. In addition, the display panel PNL may comprise a structure conforming to various modes such as Vertical Aligned (VA) mode and Twisted Nematic (TN) mode.

In the display device 1 configured as explained above, ions resulting from impurities of water or the like immersing from the outside or ions eluting from the sealing member SL, the first alignment film 14, and the second alignment film 24 may enter the liquid crystal layer LC. In this case, if such ions are collected in the display area DA, an effective voltage between the pixel electrodes PE and the common electrodes CE is lowered and an influence such as black non-uniformity in display may appear on the display image. The display device 1 according to the present embodiment desirably comprises an ion trap structure capable of allowing such ions to stay in the peripheral area SA.

Figure 4:
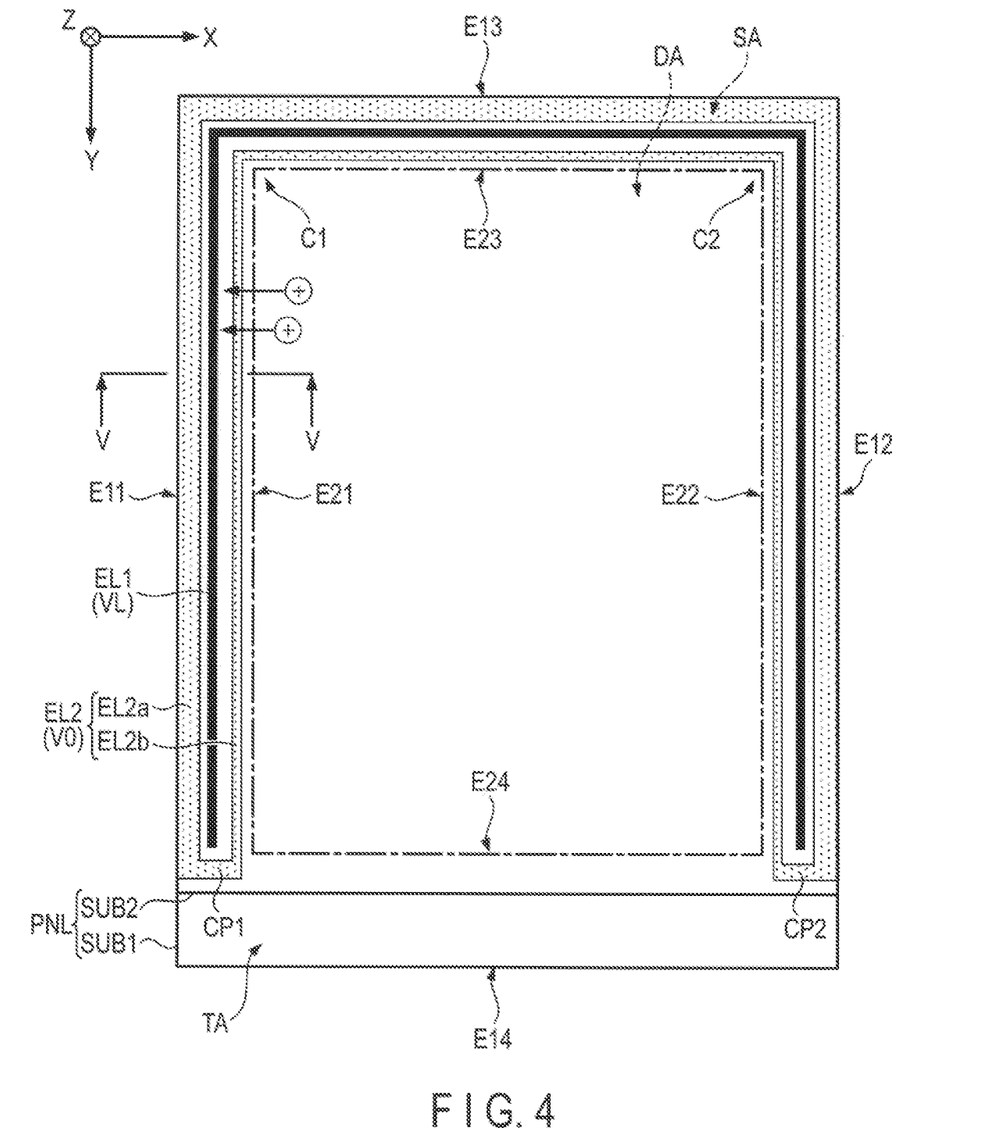
FIG. 4 is a plan view schematically showing an ion trap structure according to the first embodiment.

FIG. 4 is a plan view of the display panel PNL, schematically showing an example of the ion trap structure. In the present embodiment, the display panel PNL is shaped in a rectangle having edges E11 to E14. The edges E11 and E12 are parallel to the second direction Y, and the edges E13 and E14 are parallel to the first direction X. The edge E14 is an edge on the terminal area TA side.

In addition, the display area DA is shaped in a rectangle having edges E21 to E24. The edges E21 and E22 are parallel to the second direction Y, and the edges E23 and E24 are parallel to the first direction X. The edge E24 is an edge on the terminal area TA side.

The shape of the display panel PNL and the display area DA is not limited to a rectangle, but may be a polygon other than a square or curved at least in part.

The first substrate SUB1 comprises a first electrode EL1 and a second electrode EL2 in the peripheral area SA. The first electrode EL1 extends linearly between the edges E11 and E21, between the edges E13 and E23, and between the edges E12 and E22. The first electrode EL1 may include a portion extending in a curved shape. In addition, plural first electrodes EL1 may be intermittently disposed in the peripheral area SA.

The second electrode EL2 includes an outer portion EL2a, an inner portion EL2b disposed between the outer portion EL2a and the display area DA, and connection portions CP1 and CP2 which connect the outer portion EL2a and the inner portion EL2b. The outer portion EL2a and the inner portion EL2b extend linearly between the edges E11 and E21, between the edges E12 and E22, and between the edges E13 and E23. The outer portion EL2a and the inner portion EL2b may include portions extending in a curved shape. The first electrode EL1 is disposed between the outer portion EL2a and the inner portion EL2b. The connection portions CP1 and CP2 connect end portions of the outer portion EL2a and the inner portion EL2b on the edge E14 side.

In the example shown in FIG. 4, neither the first electrode EL1 nor the second electrode EL2 is disposed between the edges E14 and E24. However, the first electrode EL1 and the second electrode EL2 may be disposed between the edges E14 and E24. In addition, the first electrode EL1 and the second electrode EL2 do not need to be disposed in the whole area between the edges between the edges E11 and E21, between the edges E12 and E22, and between the edges E13 and E23, but the first electrode EL1 and the second electrode EL2 may be partially disposed in this area. For example, the first electrode EL1 and the second electrode EL2 may be disposed near a corner C1 formed by the edges E21 and E23, and near a corner C2 formed by the edges E22 and E23.

A first voltage VL is applied to the first electrode EL1. A second voltage V0 larger than the first voltage is applied to the second electrode EL2. For example, the first voltage VL is −7V, and the second voltage V0 is the common voltage (0V) which is the same as the voltage applied to the common electrodes CE. In this case, for example, an electric field having a strength of 0.28 V/μm is generated between the first electrode EL1 and the second electrode EL2. Plus ions in the liquid crystal layer LC are trapped into the first electrode EL1 by the electric field.

Figure 5:
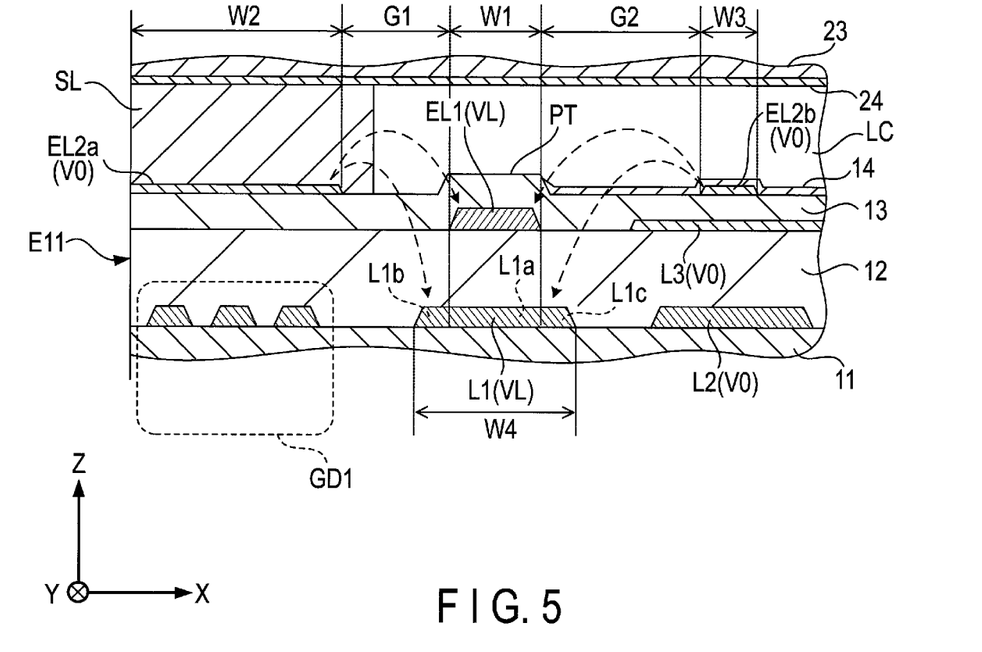
FIG. 5 is a cross-sectional view schematically showing the display panel seen along line V-V in FIG. 4.

FIG. 5 is a cross-sectional view schematically showing the display panel PNL seen along line V-V in FIG. 4. The first electrode EL1 is disposed on the second insulating layer 12, and covered with the third insulating layer 13. As the other example, the first electrode EL1 may not be covered with the third insulating layer 13.

Both of the outer portion EL2a and the inner portion EL2b of the second electrode EL2 are disposed on the third insulating layer 13. In the example shown in FIG. 5, the outer portion EL2a is covered with the sealing member SL while the inner portion EL2b is covered with the first alignment film 14. The sealing member SL is not disposed above the first electrode EL1. As the other example, the sealing member SL may be disposed above the first electrode EL1.

A first line L1 is disposed under the first electrode EL1. The above-mentioned scanning line driver GD1 is disposed under the outer portion EL2a. A second line L2 and a third line L3 are disposed under the inner portion EL2b. The first line L1 and the second line L2 are disposed on the first insulating layer 11, and covered with the second insulating layer 12. The third line L3 is disposed on the second insulating layer 12, and covered with the third insulating layer 13.

The first electrode EL1 is located at a position closer to the liquid crystal layer LC than the scanning lines G and the signal lines S. More specifically, the first electrode EL1 is disposed in the same layer as the metal line ML and is formed of the same metal material having a light shielding property as the metal line ML. In other words, the first electrode EL1 can be formed in the same process as the metal line ML. The first electrode EL1 and the metal line ML can be formed to have, for example, a multilayer structure in which an aluminum layer is sandwiched between molybdenum layers. As the other example, tungsten, copper, titanium, and the like can be used as the metal material of the first electrode EL1 and the metal line ML.

The second electrode EL2 is disposed in the same layer as the pixel electrode PE and formed of the same transparent conductive material as the pixel electrode PE. In other words, the second electrode EL2 can be formed in the same process as the pixel electrode PE.

The first line L1 and the second line L2 are disposed in the same layer as the signal line S and formed of the same metal material as the signal line S. In other words, the first line L1 and the second line L2 can be formed in the same process as the signal line S. The third line L3 is disposed in the same layer as the common electrode CE and formed of the same transparent conductive material as the common electrode CE. In other words, the third line L3 can be formed in the same process as the common electrode CE.

The scanning line driver GD1 is composed of metal lines, a semiconductor layer, and the like disposed in the same layer as the scanning line G and the signal line S. The outer portion EL2a overlaps the scanning line driver GD1 in planar view. The outer portion EL2a plays a role as a shield which blocks the electric field from the scanning line driver GD1.

As shown in the drawing, a width of the first electrode EL1 is defined as W1, a width of the outer portion EL2a is defined as W2, a width of the inner portion EL2b is defined as W3, a width of the first line L1 is defined as W4, a gap between the first electrode EL1 and the outer portion EL2a is defined as G1, and a gap between the first electrode EL1 and the inner portion EL2b is defined as G2.

In the present embodiment, the width W1 is smaller than the width W2, and the width W1 is larger than the width W3 (W3<W1<W2). For example, the width W1 is 20 μm, the width W2 is 240 μm, and the width W3 is 8 μm.

In addition, in the present embodiment, the gap G1 is smaller than the gap G2 (G1<G2). For example, the gap G1 is 25 μm and the gap G2 is 46 μm.

In addition, in the present embodiment, the width W4 is larger than the width W1. In other words, the first line L1 includes an opposed portion L1a which is opposed to the first electrode EL1, and unopposed portions L1b and L1c that are unopposed to the first electrode EL1. The unopposed portion L1b is an area extending from the first electrode EL1 toward the outer portion EL2a side, and the unopposed portion L1c is an area extending from the first electrode EL1 toward the inner portion EL2b side. The opposed portion L1a and the unopposed portions L1b and L1c extend along the first electrode EL1 shown in FIG. 4. A width of each of the unopposed portions L1b and L1c is smaller than or equal to the width W1. For example, the width of each of the unopposed portions L1b and L1c is 5 μm.

The above-mentioned first voltage VL is applied to the first electrode EL1 and the first line L1. The above-mentioned second voltage V0 is applied to the outer portion EL2a, the inner portion EL2b, the second line L2, and the third line L3. In this case, electric fields for ion trap are generated between the first electrode EL1 and the outer portion EL2a, and between the first electrode EL1 and the inner portion EL2b, as represented by broken curved lines in FIG. 5. In addition, electric fields for ion trap are also generated between the unopposed portion L1b and the outer portion EL2a, and between the unopposed portion L1c and the inner portion EL2b. Thus, in the example shown in FIG. 5, the electric fields for ion trap can be formed separately between the first electrode EL1 and the second electrode EL2, and between the first line L1 and the second electrode EL2.

A thickness of the first electrode EL1 is larger than a thickness of the second electrode EL2 (thickness of each of the portions EL2a and EL2b). The thickness of the first electrode EL1 can be set to be twice or more as large as the thickness of the second electrode EL2. For example, the thickness of the first electrode EL1 is 100 μm while the thickness of the second electrode EL2 is 40 μm. For example, the thickness of the first electrode EL1 is substantially the same as the thickness of the third insulating layer 13.

A protrusion PT resulting from the first electrode EL1 is generated on the upper surface of the third insulating layer 13. A height of the protrusion PT is the same as, for example, the thickness of the first electrode EL1. The first alignment film 14 can be formed by, for example, applying an alignment film material on the first alignment film 13 by a printing method or the like and then curing the alignment film material. The protrusion PT functions as a stopper which blocks the alignment film material to be cured.

In the example shown in FIG. 5, the first alignment film 14 therefore does not exist between the protrusion PT (or the first electrode EL1) and the edge E11. Therefore, since the first alignment film 14 does not exist under the sealing member SL, adherence between the sealing member SL and the first substrate SUB1 is enhanced.

The first alignment film 14 may exist between the protrusion PT and the edge E11. In this case, too, since the alignment film material to be cured is somewhat blocked by the protrusion PT, the thickness of the first alignment film 14 between the first electrode EL1 and the edge E11 is smaller than the thickness of the first alignment film 14 between the first electrode EL1 and the display area DA (right side in the drawing).

The structures between the edges E12 and E22, and between the edges E13 and E23 are the same as that shown in FIG. 5, and their explanations are omitted.

Figure 6:
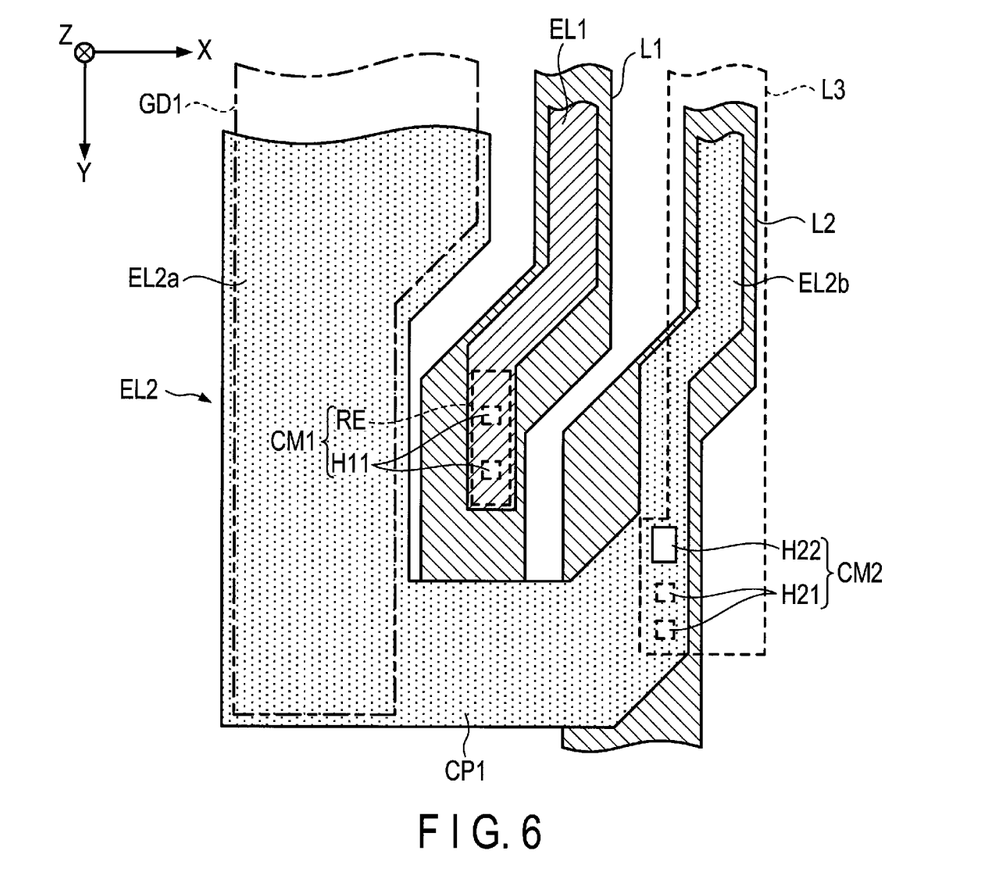
FIG. 6 is an enlarged plan view showing a vicinity to a connection portion of a second electrode shown in FIG. 4.

FIG. 6 is an enlarged plan view showing a vicinity to a connection portion CP1 shown in FIG. 4. The first electrode EL1 and the first line L1 are electrically connected via a first connection structure CM1. The second electrode EL2 and the lines L2 and L3 are electrically connected via a second connection structure CM2.

The first connection structure CM1 comprises two contact holes H11 and a relay electrode RE. The second connection structure CM2 comprises two contact holes H21 and a contact hole H22. The contact holes H11 and H21 penetrate the second insulating layer 12. The contact hole H22 penetrates the third insulating layer 13.

The replay electrode RE is disposed on the second insulating layer 12. The relay electrode RE is disposed in the same layer as the common electrode CE and formed of the same transparent conductive material as the common electrode CE. In other words, the relay electrode RE can be formed in the same process as the common electrode CE. The relay electrode RE is in contact with the first line L1 through the contact holes H11. Furthermore, the relay electrode RE is covered with the first electrode EL1. The first electrode EL1 and the first line L1 are thus electrically connected to each other.

The third line L3 is in contact with the second line L2 through the contact holes H21. The second electrode EL2 is in contact with the third line L3 through the contact hole H22. The second electrode EL2 and the lines L1 and L3 are thus electrically connected to each other.

The above-mentioned controller 2 supplies the first voltage VL to the first line L1, and supplies the second voltage V0 to the second line L2 and the third line L3.

The first connection structure CM1 and the second connection structure CM2 are also provided near the connection portion CP2 shown in FIG. 4. The positions where the first connection structure CM1 and the second connection structure CM2 are provided are not limited to two positions but may be more positions.

Next, an advantage of the present embodiment will be explained with a comparative example in FIG. 7. In this comparative example, the first electrode EL1 is formed of ITO of the same layer as the second electrode EL2 (portions EL2a and EL2b).

If the first voltage VL is applied to the first electrode EL1, positive ions in the liquid crystal layer LC are drawn toward the first electrode EL1. If the first voltage VL is applied to the first electrode EL1 for a long time, $In_2O_3$ contained in ITO is corroded (reduced) by positive ions, and $O_2$ gas and lower oxide InOx are generated. Air bubbles of $O_2$ gas are generated and accumulated, for example, between the first alignment film 13 and the first alignment film 14 and in the liquid crystal layer LC, which is one of reasons for degradation in reliability of the display device. In addition, the first electrode EL1 is whitened by lower oxide InOx.

In the configuration of the comparative example, it was found by experiments that corrosion of the first electrode EL1 hardly occurs as the gaps G1 and G2 are made sufficient large. However, if the gaps G1 and G2 are made larger, narrowing the frame of the display device becomes difficult since the width of the peripheral area SA is larger.

In addition, in the configuration of the comparative example, the alignment film material can hardly be blocked in the formation of the first alignment film 14 since the first electrode EL1 is thin. The first alignment film 14 can be therefore formed to extend up to a lower side of the sealing member SL.

In contrast, in the structure of the present embodiment shown in FIG. 5, the first electrode EL1 is formed of the same metal material as the metal line ML. As explained above, the metal line ML can be formed of aluminum, molybdenum, tungsten, copper, titanium, or the like, and these metal materials are materials which can hardly be reduced as compared with ITO. Therefore, corrosion (reduction) of the first electrode EL1 can be suppressed and the reliability of the display device 1 can be increased.

Since the corrosion of the first electrode EL1 is thus suppressed, the gaps G1 and G2 can be made smaller. Since the width of the peripheral area SA is thereby made smaller, the frame of the display device 1 can be narrowed.

In addition, the alignment film material can be blocked by the protrusion PT as explained above. Therefore, the adherence of the sealing member SL can be enhanced and the reliability of the display device 1 can be further increased.

In addition to the above, various suitable advantages can be obtained from the present embodiment.

[Second Embodiment]

A second embodiment will be described. Explanations of the same constituent elements and advantages as the first embodiment will be omitted.

Figure 8:
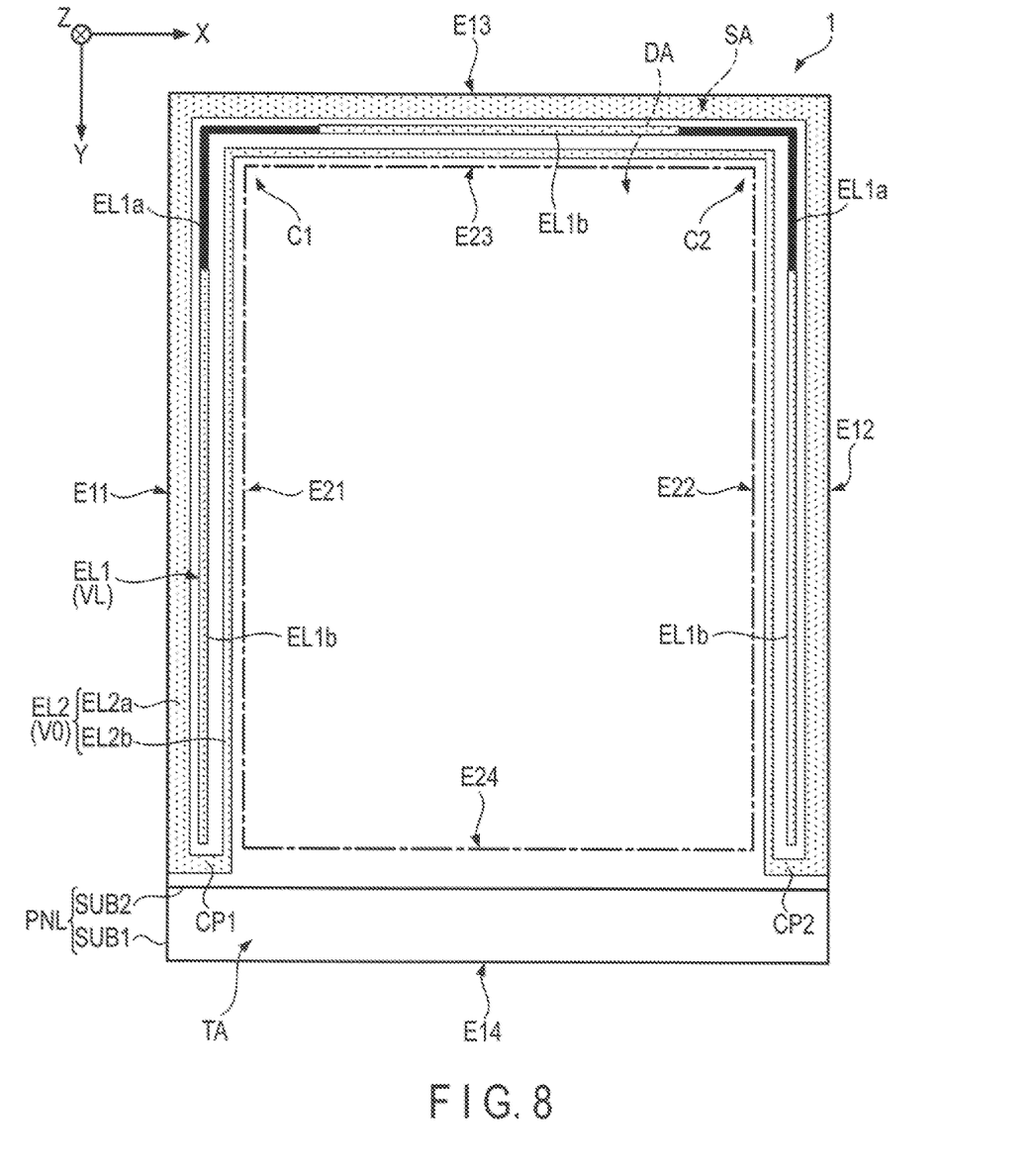
FIG. 8 is a plan view schematically showing an ion trap structure according to a second embodiment.

FIG. 8 is a plan view schematically showing a display device 1 according to the second embodiment. An example of an ion trap structure is shown similarly to FIG. 4. In the present embodiment, a first electrode EL1 includes a first portion EL1a formed of a metal material and a second portion EL1b formed of a transparent conductive material.

In the example shown in FIG. 8, the first portions EL1a are disposed near a corner C1 formed by the edges E21 and E23, and near a corner C2 formed by the edges E22 and E23, respectively. In addition, the second portions EL1b are disposed between edges E11 and E21, between edges E12 and E22, and between edges E13 and E23, respectively.

Two first portions EL1a are bent at right angles along corners C1 and C2, respectively. The first portions EL1a may be bent in a slightly arcuate shape along corners C1 and C2, respectively. Three second portions EL1a extend linearly along the edges E21, E22, and E23, respectively. Two first portions EL1a and three second portions EL1b are connected at their ends, and entirely form the same shape as the first electrode EL1 shown in FIG. 4.

A sectional structure of a peripheral area SA including the first portions EL1a is the same as that shown in FIG. 5.

Figure 7:
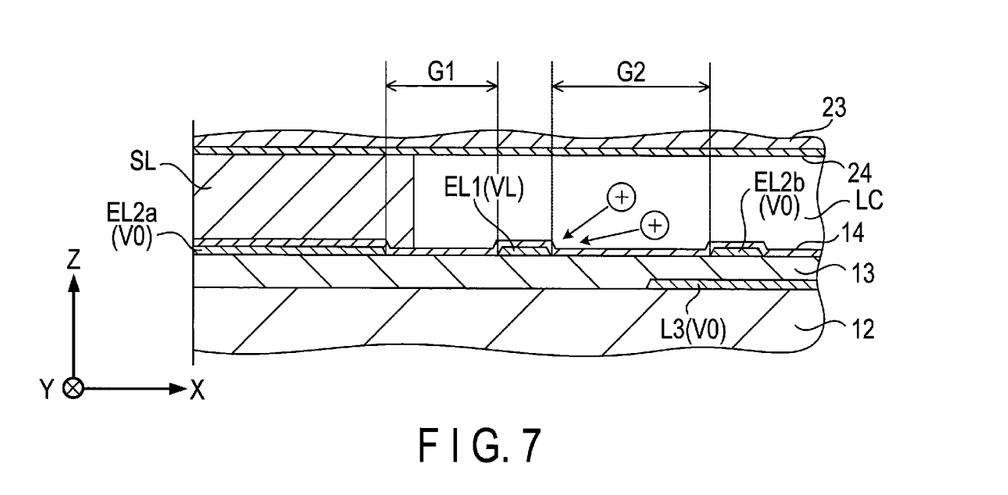
FIG. 7 is a cross-sectional view showing a comparative example of the first embodiment.

In addition, a sectional structure of a peripheral area SA including the second portions EL1b is the same as that in the comparative example shown in FIG. 7. The sectional structure of the peripheral area SA including the second portions EL1b may be the same as that in the modified example shown in FIG. 9.

Figure 9:
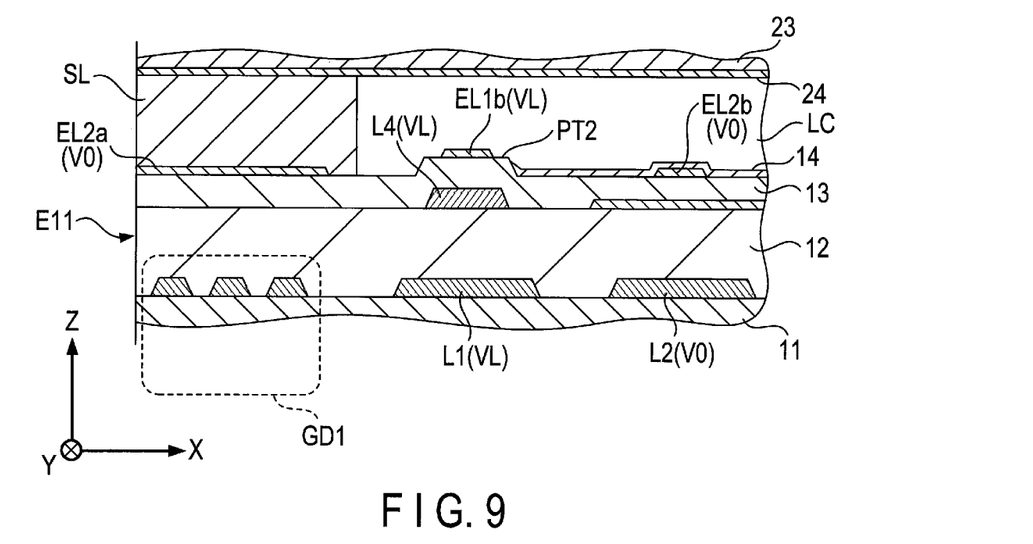
FIG. 9 is a view showing a modified example of a cross-sectional structure of the liquid crystal display device according to the second embodiment.

In this modified example, a fourth line L4 is disposed below the second portion EL1b. The fourth line L4 is disposed on a second insulating layer 12, and covered with a third insulating layer 13. The fourth line L4 is disposed in the same layer as a metal line ML and is formed of the same metal material as the metal line ML. In other words, the first electrode EL1 can be formed in the same process as the metal line ML.

A protrusion PT2 resulting from the fourth line L4 is generated on the upper surface of the third insulating layer 13. The second portion EL2b is disposed on the protrusion PT2. An alignment film material to be cured can be blocked by the protrusion PT2 in the formation of a first alignment film 14.

Figure 10:
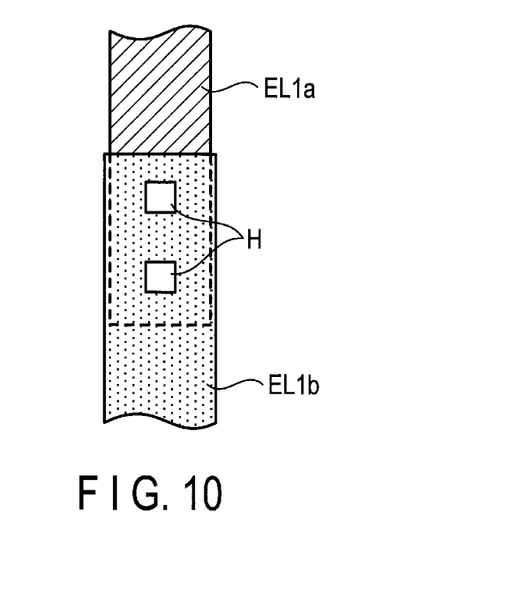
FIG. 10 is a plan view schematically showing a vicinity to a boundary between a first portion and a second portion of the first electrode.

FIG. 10 is a plan view schematically showing a vicinity to a boundary between the first portion EL1a and the second portion EL1b. The first portion EL1a and the second portion EL1b are in contact with two contact holes H that penetrate the third insulating layer 13. The first portion EL1a and the second portion EL1b are thereby electrically connected to each other. The number of the contact holes H is not limited to two but may be one or three or more.

In the above-explained embodiment, the second portion EL1b is located at a position closer to the liquid crystal layer LC than the first portion EL1a. Therefore, since an electric field formed between the second portion EL1b and the second electrode EL2 can easily act on the liquid crystal layer LC, the ion trap ability can be enhanced.

Ions in the liquid crystal layer LC can easily be collected at positions close to the corners C1 and C2. Therefore, the above-explained corrosion (reduction) occurs mainly at the positions close to the corners C1 and C2. The corrosion can be prevented similarly to the first embodiment, by forming the first electrode EL1 of the metal material at the only positions close to the corners C1 and C2 similarly to the present embodiment.

All of the display devices that can be implemented by a person of ordinary skill in the art through arbitrary design changes to the display devices described above as embodiments of the present invention come within the scope of the present invention as long as they are in keeping with the spirit of the present invention.

Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A liquid crystal display device, comprising:
a first substrate including an image display area, a peripheral area outside the display area, a common electrode in the display area, a scanning line extending in the display area, a signal line which extends in the display area and intersects the scanning line, a switching element driven by the scanning line and the signal line, a pixel electrode opposed to the common electrode and connected to the switching element, and a first electrode and a second electrode in the peripheral area;
a second substrate opposed to the first substrate;
a sealing member sticking the first substrate and the second substrate to each other; and
a liquid crystal layer in a space surrounded by the first substrate, the second substrate, and the sealing member, wherein
at least a part of the first electrode is formed of a metal material having a light shielding property and is disposed at a position closer to the liquid crystal layer than the scanning line and the signal line,
a first voltage is applied to the first electrode,
a second voltage larger than the first voltage is applied to the second electrode,
ions existing in the liquid crystal layer are trapped by an electric field formed between the first electrode and the second electrode,
the first electrode includes a first portion formed of a metal material, and a second portion formed of a transparent conductive material.

2. A liquid crystal display device, comprising:
a first substrate including an image display area, a peripheral area outside the display area, a common electrode in the display area, a scanning line extending in the display area, a signal line which extends in the display area and intersects the scanning line, a switching element driven by the scanning line and the signal line, a pixel electrode opposed to the common electrode and connected to the switching element, and a first electrode and a second electrode in the peripheral area:
a second substrate opposed to the first substrate:
a sealing member sticking the first substrate and the second substrate to each other: and
a liquid crystal layer in a space surrounded by the first substrate, the second substrate, and the sealing member, wherein
at least a part of the first electrode is formed of a metal material having a light shielding property and is disposed at a position closer to the liquid crystal layer than the scanning line and the signal line,
a first voltage is applied to the first electrode,
a second voltage larger than the first voltage is applied to the second electrode,
ions existing in the liquid crystal layer are trapped by an electric field formed between the first electrode and the second electrode,
the second electrode includes an outer portion and an inner portion disposed between the outer portion and the display area,
the first electrode is disposed between the outer portion and the inner portion,
the first substrate further includes an alignment film which is in contact with the liquid crystal layer, and
at least a part of the inner portion overlaps the alignment film.

3. A liquid crystal display device, comprising:
a first substrate including an image display area, a peripheral area outside the display area, a common electrode in the display area, a scanning line extending in the display area, a signal line which extends in the display area and intersects the scanning line, a switching element driven by the scanning line and the signal line, a pixel electrode opposed to the common electrode and connected to the switching element, and a first electrode and a second electrode in the peripheral area;
a second substrate opposed to the first substrate;
a sealing member sticking the first substrate and the second substrate to each other; and
a liquid crystal layer in a space surrounded by the first substrate, the second substrate and the sealing member, wherein
at least a part of the first electrode is formed of a metal material having a light shielding property and is disposed at a position closer to the liquid crystal layer than the scanning line and the signal line,
a first voltage is applied to the first electrode,
a second voltage larger than the first voltage is applied to the second electrode,
ions existing in the liquid crystal layer are trapped by an electric field formed between the first electrode and the second electrode, and
a thickness of the first electrode is larger than a thickness of the second electrode.

4. The liquid crystal display device of claim 1, wherein
the first substrate further includes a metal line in the display area, which is electrically connected to the common electrode and extends along the signal line, and
the first portion of the first electrode is formed of the same metal material as the metal line.

5. The liquid crystal display device of claim 1, wherein
the display area has a shape including a linear edge and a corner,
the first portion extends along the corner, and
the second portion extends along the linear edge.

6. The liquid crystal display device of claim 3, wherein
the first substrate further includes a first line disposed at a position farther from the liquid crystal layer than the first electrode in the peripheral area, and a first connection structure which electrically connects the first electrode and the first line to each other, and
the first line extends along the first electrode.

7. The liquid crystal display device of claim 6, wherein
the first line includes an opposed portion which is opposed to the first electrode and extends along the first electrode, and an unopposed portion which is unopposed to the first electrode and extends along the first electrode.

8. The liquid crystal display device of claim 3, wherein
the first substrate further includes a second line disposed at a position farther from the liquid crystal layer than the second electrode in the peripheral area, and a second connection structure which electrically connects the second electrode and the second line to each other, and
the second line extends along the second electrode.

9. The liquid crystal display device of claim 2, wherein
a gap between the first electrode and the inner portion is larger than a gap between the first electrode and the outer portion.

10. The liquid crystal display device of claim 2, wherein
the second electrode includes a connection portion which connects the outer portion and the inner portion to each other, and
the first electrode is surrounded by the outer portion, the inner portion, and the connection portion in planar view.

11. The liquid crystal display device of claim 2, wherein at least a part of the outer portion overlaps the sealing member.

12. The liquid crystal display device of claim 2, wherein the first substrate includes a driver which supplies a signal to the scanning line, and
at least a part of the outer portion overlaps the driver.

13. The liquid crystal display device of claim 2, wherein a width of the first electrode is smaller than a width of the outer portion.

14. The liquid crystal display device of claim 2, wherein a width of the first electrode is larger than a width of the inner portion.

15. The liquid crystal display device of claim 2, wherein
the first substrate further includes an alignment film which is in contact with the liquid crystal layer, and
the alignment film does not exist between the first electrode and an edge of the first substrate.

16. The liquid crystal display device of claim 3, wherein
the first substrate further includes an alignment film which is in contact with the liquid crystal layer, and
a thickness of the alignment film between the first electrode and an edge of the first substrate is smaller than a thickness of the alignment film between the first electrode and the display area.

17. The liquid crystal display device of claim 3, wherein the second electrode is formed of a transparent conductive material.

18. The liquid crystal display device of claim 3, wherein
the first substrate is in a rectangular shape having four edges, and
the first electrode and the second electrode are provided along three edges of the first substrate.

* * * * *